United States Patent [19]

Small

[11] Patent Number: 4,929,951

[45] Date of Patent: May 29, 1990

[54] APPARATUS AND METHOD FOR TRANSFORM SPACE SCANNING IMAGING

[75] Inventor: James G. Small, Westlake Village, Calif.

[73] Assignee: Hughes Aircraft Company, Los Angeles, Calif.

[21] Appl. No.: 289,275

[22] Filed: Dec. 23, 1988

[51] Int. Cl.⁵ .............................................. G01S 13/89
[52] U.S. Cl. ...................................... 342/179; 342/54; 342/189; 342/180; 356/28.5; 250/334
[58] Field of Search .................. 342/179, 180, 196, 59, 342/54, 189; 250/330, 334; 356/28.5, 4, 28

[56] References Cited

U.S. PATENT DOCUMENTS

| | | | |
|---|---|---|---|
| 3,909,827 | 9/1975 | Tricoles et al. | 342/179 |
| 3,953,822 | 4/1976 | Vilkomerson | 367/11 |
| 4,011,445 | 3/1977 | O'Meara | 455/604 |
| 4,044,247 | 8/1977 | Brown, Jr. | 455/619 |
| 4,630,051 | 12/1986 | Adams et al. | 342/133 |
| 4,716,414 | 12/1987 | Luttrell et al. | 342/179 |
| 4,717,916 | 1/1988 | Adams et al. | 342/107 |
| 4,802,149 | 1/1989 | Moore | 342/108 X |

Primary Examiner—Thomas H. Tarcza
Assistant Examiner—John B. Sotomayor
Attorney, Agent, or Firm—William J. Streeter; Wanda K. Denson-Low

[57] ABSTRACT

An image of a target (11) is produced by illumination of the target (11) with overlapping fields (18, 20) of wave energy, such as coherent light, producing an interference pattern (22) moving across the target. At least one pair (12) of sources (14, 16) wave energy provide the moving interference pattern (22). The scattered illumination reflected from the target is detected by a non-imaging receiver (24); a two dimensional spatial frequency map is recorded (30, 62), based upon the amplitude, frequency and phase of the illumination received; and a two dimensional image of the target is formed (32, 72) by applying a Fourier transform to the two dimensional frequency map.

26 Claims, 1 Drawing Sheet

APPARATUS AND METHOD FOR TRANSFORM SPACE SCANNING IMAGING

BACKGROUND OF THE INVENTION

STATEMENT OF GOVERNMENT INTEREST

This invention was made with Government support under contract F29601-86-C-0012 awarded by the Department of the Air Force. The Government has certain rights in this invention.

1. Field of the Invention

This invention relates generally to a method and apparatus for imaging an object by illumination with wave energy such as acoustic or electromagnetic radiation capable of producing an interference pattern. One such wave energy source adaptable to the invention is laser light. The invention more particularly relates to an apparatus and method for scanning a target with moving interference patterns projected by an illuminator. Wave energy scattered from the object is detected by a non-imaging wave energy receiver and images are synthesized by post detection computer processing of recorded electrical signals.

2. Description of the Related Art

There are several ways to generate an image by means of scanned illumination of an object. One such technique is flying spot scanning illumination, in which an illuminating spot is scanned in a raster across an object, and the scattered or reflected light is detected by a non-imaging light detector. A raster synchronized television-like receiver display can reproduce the image scanned by the spot, provided that the original waveform produced by the scanning is available.

Phased array beam transmission and reception are well known in the microwave, RF and sonar arts. Such systems operate on the principle that beam scanning can be accomplished by phase differencing between emitters or receivers in an array, thereby causing the wavefront propogated to be steered at an angle from the plane of the array in proportion to the phase shaft across the elements. Examples of optically phase steered transmitters may be found in U. S. Pat. Nos. 3,878,520 and 4,028,702. While it is often desirable to propagate a single beam according to this method, multiple beams may be propagated from a single array if portions of the array are each devoted to one beam.

Similarly, beam steering radar receivers may be configured in which the impinging wavefront of an incoming signal is sensed to provide an indication of direction as well as signal strength This may be accomplished either by providing a scanned phase "gate" for the elements, which only accepts signals with a phase corresponding with the beam direction desired, or the signals in the beam of interest may be reconstructed from the signals received at the elements However, such techniques usually result in the power of the array being divided among the beams Although the beams can be rapidly scanned, much of the signal power from incoming waves is lost or wasted when the beam is pointing in other directions, except in certain radar applications where the direction of incoming waves are known a priori. In order to overcome these limitations, it would be desirable to provide an imaging system which can observe the entire field of view in all possible directions simultaneously, record signals from all incoming waves and reconstruct images of all objects in the field of view. Although simultaneous multiple beam receivers are known in sonar and some are directional receivers, it would be desirable to provide an imaging system in which multiple illuminators and one principal receiver are provided, rather than multiple receivers, to simplify the system and improve resolution.

SUMMARY OF THE INVENTION

The present invention is based upon the principle that an image of an object can be described by a spatial frequency map of the energy reflected from the object. The spatial frequencies are related to the image of the object by a two dimensional spatial Fourier transformation. Transform space scanning imaging is a means of directly measuring the spatial frequencies from which an image of an object scanning may be reconstructed. The present invention provides a method and apparatus for transform space scanning imaging of an object or a target by illumination with overlapping fields of wave energy, which may be acoustic or electromagnetic radiation, which produce an interference pattern moving across the target in a predictable manner. While a variety of frequencies of such radiation may be used for the invention, it has been found that coherent light waves of the type produced by a laser are useful for this purpose and are used for the purpose of illustration herein. At least one pair of sources of coherent light provides a moving interference pattern by propagating into space wave fronts with frequencies displaced from one another by a known frequency difference. The scattered illumination reflected from the target is detected by a non-imaging receiver that preserves the frequency content of the reflected wave. From these received waveforms, a two dimensional spatial frequency map is recorded, based upon the amplitude, frequency and phase of the signals received Thereafter, a two dimensional image of the target is formed by applying a Fourier transform to the two dimensional frequency map.

Briefly and in general terms, the present system for transform space scanning imaging comprises the illumination of an object with wave energy such as coherent laser light from one or more pairs of spaced apart sources providing overlapping fields of illumination at frequencies displaced from one another to thereby produce interference patterns. The light propagated by the illuminators is not focused, but is rather propagated into space in an overlapping pattern in the broad areas to be scanned. Light scattered from the target is received by a non-imaging light detector for recording the amplitude, frequency and phase of the illumination reflected from the target, and a two dimensional spatial frequency map of the received signals is formed by a signal processing unit. Images are synthesized by processing of the two dimensional frequency map by Fourier transformation.

In one preferred embodiment, there is a plurality of pairs of laser light sources, and the frequencies of laser light produced by each of the pair of laser light sources are different by a known difference in frequency, so that they produce a far field interference pattern which moves across, and illuminates the target area. In this embodiment the frequency and phasing of the received signals are cross correlated with the frequency and phasing of the transmitted signals, in order to identify the spatial frequency information provided by each pair of source emitters.

In another preferred embodiment, one pair of sources of coherent laser light is provided, with each source providing the same frequency of light, but the sources are sequentially moved a predetermined set series of distances apart in order to provide varying illumination and generate variations in spatial frequency information. In this embodiment, the transform space scanning imaging technique of the present invention is adaptable to microscopy, and it is also preferred to introduce curvature electronically to the recorded spatial frequency map in order to achieve focus of the waves in the desired microscopy target area.

From the above, it may be seen that the present invention provides a means of imaging objects in space without the necessity for steered scanning beams propagated by a transmitter with the resultant loss of energy or coverage implied by those methods.

Other benefits and advantages of the invention will become apparent from the following detailed description and the accompanying drawings, which illustrate, by way of example, the features of the invention.

DETAILED DESCRIPTION OF THE INVENTION

Figure 1:
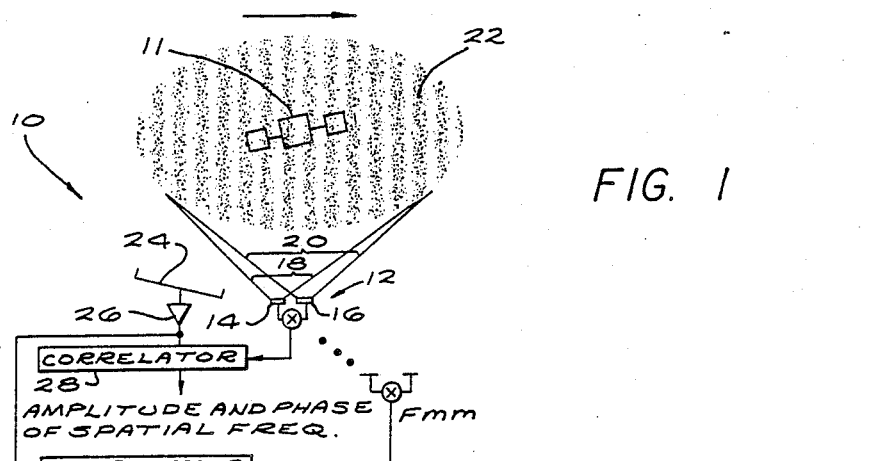
FIG. 1 is a schematic diagram of a transform space scanning imaging apparatus according to the invention.

As is shown in the illustrative drawings, the invention is embodied in an apparatus for transform space scanning imaging of an object The apparatus includes one or more pairs of spaced apart sources of wave energy, such as coherent light, generating radiating patterns that produce interference patterns which illuminate the target, at least one receiver for detecting the light reflected from the target, signal processing means for determining the spatial frequencies in the reflected radiation detected by the receiver, and an image display device for displaying a two dimensional image derived from upon the spatial frequency map.

In accordance with the invention, in one embodiment there is provided an apparatus for transform space scanning imaging which includes means for illuminating a target comprising at least one pair of spaced apart sources of wave energy, the pair of sources further including a first source emitting wave energy having a first frequency and a second source emitting wave energy at a second frequency, the first and second sources propagating overlapping fields of illumination for producing at least one interference pattern. One means of providing such wave energy in the form of coherent light is a laser, of which there are a wide variety adaptable to various apparatus useful to the invention. In this aspect of the invention, the invention further includes a receiver which incorporates a photodetector or photodetector array for receiving the light reflected from the target and producing from the detection of those signals a first electrical signal indicative of the amplitude and phase of the reflected illumination detected at the receiver. A signal processing system is included which is responsive to the first set of electrical signals, determines from them the spatial frequencies of the received illumination reflected from the target and produces a second set of electrical signals representative of a two dimensional spatial frequency map of the target The two dimensional spatial frequency map is used by an image forming means subsystem to produce a two dimensional image of the target.

In another embodiment, the invention further provides for an apparatus for transform space scanning microscopy imaging. Such an embodiment includes an illuminating subsystem including at least a pair of spaced apart sources of coherent laser light for illuminating an area to be scanned, the pair of identifying sources including a first source of coherent laser light having a first frequency and a second source of coherent laser light having a second frequency, the pair of sources producing overlapping fields of illumination to fully produce an interference pattern. The first source of ilustration is essentially fixed and the second source is movable, such that the distance of spacing between the first and second sources is adjustable. There is also included a receiver for receiving illumination reflected from the target comprising a photodetector or photodetector array for producing an output of a first electrical signal indicative of amplitude and phase of the spatial frequency received at each spatial positioning of the sources of the pair. A signal processing system for determining and recording the spatial frequencies of received illumination for each spatial positioning of the sources is included, as well as a system for producing a second electrical signal representative of a two dimensional frequency map of the target. From these received data, an image forming system responsive to a second electrical signal produces an optical two dimensional image of the target.

In addition, the invention provides for a method for transform space scanning imaging that is adaptable to a variety of equipment arrangements. The method includes illuminating a target with wave energy such as coherent laser light from at least one pair of spaced apart sources, the first source having a first frequency and the second source having a second frequency, to produce overlapping fields of illumination generating at least one interference pattern in the far field. The scattered illumination reflected from the target is detected by a non-imaging photodetector means incorporated in a receiver, which produces an output consisting of a first electrical signal indicative of the amplitude and phase of the reflected. A two dimensional spatial frequency map is formed from the signal based upon the amplitude and phase of the received illumination and a second electrical signal representative of said the dimensional spatial frequency is also derived. A two dimensional image of the object is formed from the second signal.

The invention furthermore provides a method for transform space scanning microscopy. The method includes illuminating a target with coherent light from a pair of spaced apart sources, the sources including a first source having a first frequency and a second source having a second frequency, the sources producing overlapping fields of illumination in the far field which generate an interference pattern. The second source is positioned at least two different distances spaced apart from the first source. The illumination scattered by reflection from the target is received for each such spacing of the sources. A two dimensional spatial frequency map based upon the first electrical signals indicative of the amplitude and phase of illumination received from the target is formed, and a second electrical signal representative of the two dimensional spatial frequency map is produced. From this map a two dimensional image of the target is derived by applying a two dimensional fourier transform to the map.

As is shown in FIG. 1 of the illustrating drawings, a transform space scanning imaging apparatus 10 is directed generally towards a target 11. The target is illuminated by an array of pairs 12 of sources of coherent light, with each pair consisting of a first source 14 emitting coherent light of a first frequency, and a second source 16 emitting coherent laser light of a second frequency which may be the same or different from that of the first source. In one preferred embodiment, the frequencies of each of the sources in a pair are different, and the beat frequencies for each pair are therefore also unique, so that the reflected illumination from each pair is uniquely identifiable. In such an embodiment, the first laser light source produces an illumination field 18 overlapping the illumination field 20 of the second source, to produce an interference pattern 22.

The illumination is scattered and reflected back by an object in the field of vision to a non-imaging receiver 24, which is preferably a photodetector, having a DC signal output directed through an amplifier 26 to correlator units 28. The correlation tracking is used to separate the many beat frequencies in the receiver, so that it is not necessary for the illuminators to operate at fixed or stable beat frequencies. Thus, the illuminators need only have distinguishable signatures during the integration time required to development a good signal to noise ratio. This is a significant feature, since it implies that an illuminator array can use free running sources for derivation of the propagated waves.

Figure 2:
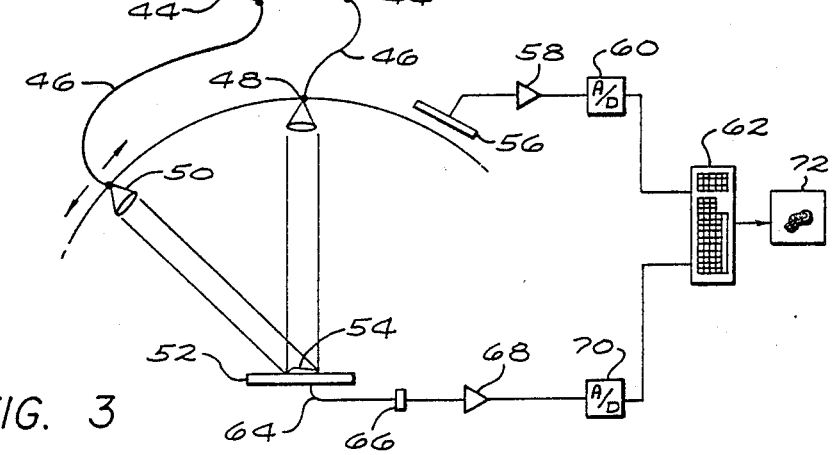
FIG. 2 is an illustration of an interference pattern created by a pair of coherent laser light sources.

FIGS. 1 and 2 generally illustrate the method for measuring a spatial frequency. If both of the sources of coherent laser light with overlapping fields of illumination shown in FIG. 2 have the same frequency, they will project a stationary interference pattern into space. The spacing between interference fringes at a distance R from the sources is given by the formula $D = R\lambda/d$. If the optical sources have differing optical frequencies, the interference pattern will not be stationary, but will move across the field of view in a predictable way. For example, the sources may be two separate single frequency lasers with a frequency difference $F_1 - F_2 = 1$ MHz. The interference pattern will also have the same spacing between fringes D, but the fringes will sweep across the object If $F_1 > F_2$ the fringe pattern sweeps from left to right. The sweep speed or rate at which fringes encounter the edges of the object is given by the source difference frequency which in a preferred exhibits is 1 MHz.

Referring again to FIG. 1, this figure illustrates the method and apparatus for recording the spatial frequencies of an object scene. If only one pair of sources with the frequency difference of 1 MHz is used, a single point on the object will scatter light periodically to provide a variation in amplitude of reflected light at a 1 MHz rate as the interference pattern sweeps across the object. An intensity recording receiver will produce a 1 MHz electrical output signal based upon reception of the light scattered by that point.

Some examples may be used to illustrate the character of the scattered light from a target. If some feature on the target, such as a small panel, is exactly the same width as the fringe spacing D, the small panel will be exactly half bright and half dark, since it spans one fringe. As the fringes move across the panel, the total light intensity scattered by the panel remains constant and the receiver will detect a DC level due to the panel, but will produce no 1 MHz AC output signal. The spatial frequency of such a panel has an amplitude of zero for the frequency corresponding to the fringe spacing D. By contrast, if a second panel has a width equal to one-half the fringe spacing D, that panel will alternately be fully illuminated and fully dark. The panel will scatter a total light intensity which is strongly modulated at 1 MHz. From this it may be seen that the panel can be said to have a high amplitude at the spatial frequency of D. At some spatial frequencies, such a panel will have a much higher amplitude than a single point scatter. At other spatial frequencies, it can have a very low scattering amplitude. By contrast, a point scatterer would scatter all spatial frequencies with equal but low amplitudes.

The receiver output of the invention contains a signal which is modulated at 1 MHz from the sum of all the scattering surfaces on the object. The amplitude of that 1 MHz signal is the amplitude of the spatial period D. The phase of the 1MHz signal is also important and provides an indication of where in the field of view the object is located. The phase or zero crossing time of the signal is related to the time at which a fringe encounters the edge of the object. The phase of the received 1 MHz signal must be measured relative to the phase of the outgoing illumination or relative to the phase of other received spatial frequencies. From the above it may be seen that the method and apparatus of the invention provides a rich source of information about the object illuminated that may be used to reconstruct an image of the object.

To recover a detailed image, many spatial frequencies must be measured in both X and Y dimensions. FIG. 1 illustrates that the measurements may be performed simultaneously with many pairs of illuminators. Each illuminator pair can have a spacing and an orientation chosen to measure one spatial frequency. Each pair will also preferably have a unique beat frequency which "tags" the return signal.

The correlation tracking receiver provides an electrical signal representing the amplitude and phase of the spatial frequencies of each illuminator pair. These first electrical signals are received and operated on by the computer 30 to form and record a two dimensional spatial frequency map. The computer operates as a signal processor to form two dimensional images on the display device 32 by operating on the two dimensional spatial frequency information by Fourier transformation.

Figure 3:
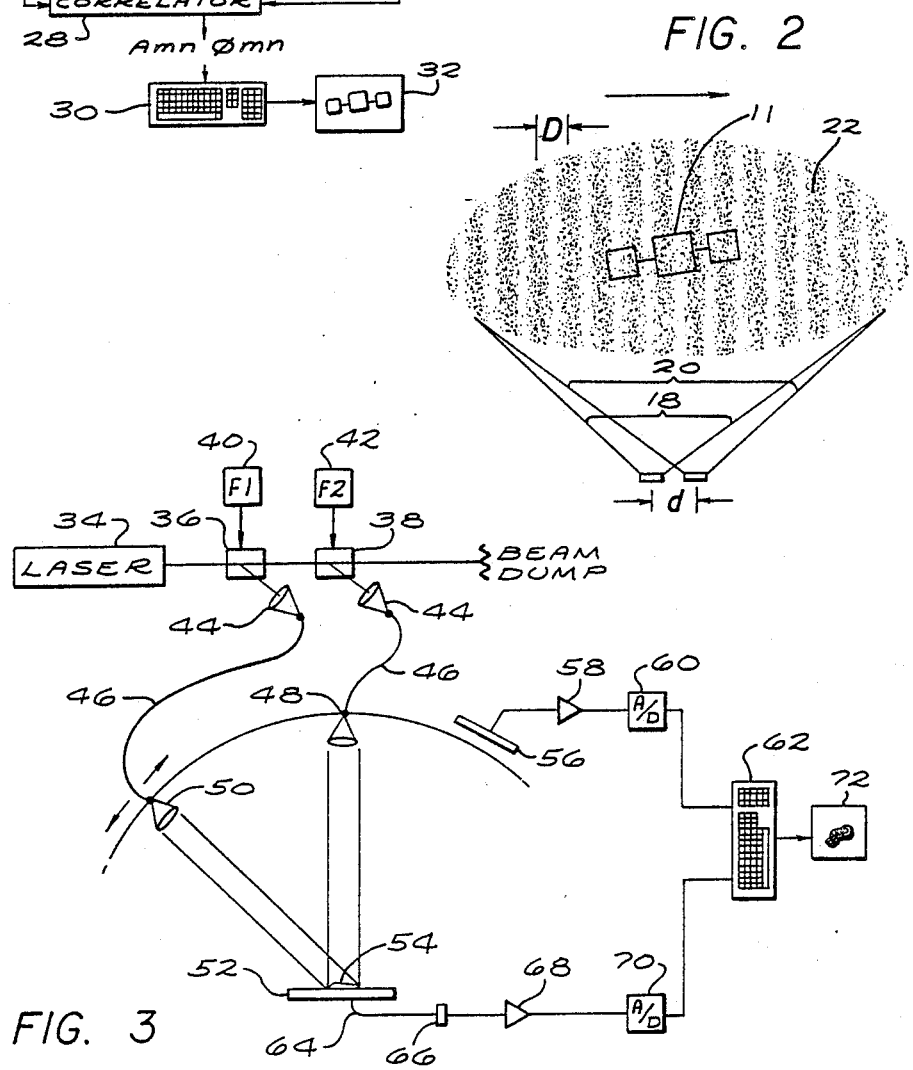
FIG. 3 is a schematic diagram of an apparatus for transform space scanning microscopy imaging.

FIG. 3 illustrates a microscope embodiment of the transform space scanning imaging apparatus. When the object to the imaged is not moving, only two illuminating sources are needed. The sources may be derived from the same laser 34, and preferably include at least one of the acousto optical beam deflectors 36 and 38, in combination with the RF drivers 40 and 42, which operate as frequency shifters of the coherent laser light provided from the single source 34. The illuminating sources are thus the frequency shifters 36 and 38, and may have any convenient beat frequency, although one frequency found to be advantageous for such apparatus is 50kHz. The sources preferably include lenses 44 for focusing the laser light to be transmitted by single mode optical fibers 46 to an optical projection source. The spacing between sources may be mechanically changed to measure spatial frequencies one at a time. As illustrated in FIG. 3, one of the sources 48 may be fixed, while the other source 50 movable. The resulting phased array illuminator is synthesized by post detection processing in the computer 30. The illumination is directed to the target 52 generally, such as a slide, bearing a specimen 54.

The principal means of detection of the scattered light reflected from the specimen is by the photodetector 56, which provides a DC signal amplified by the amplifier 58, and converts it to a digital signal by means of the analog to digital converter 60. This digital signal is transmitted to the computer 62 for recording the spatial frequency information to form the spatial frequency map. Alternatively, an additional optical fiber 64 may collect light in the general area of the target, for transmitting light from the target area to a photodetector 66, also in circuit with an amplifier 68 and an analog to digital converter 70 for measuring the phase of the scanning interference pattern at the target area. The electrical digital signals representing the phase information from the interference pattern are received by the computer, and are used to provide a phase reference signal with respect to the electrical signals developed at photodetector 56. By this method, extreme optical tolerance control of the moving sources 48 and 50 is not required. The phase corrected digital signals from photodetector 56 are then processed by Fourier transformation to produce an electrical output to a display device 72 to form a two dimensional image of the specimen.

Since the interference pattern fills a large volume of space, such imaging systems will have a very large depth of field. At no time is it necessary that there be a physically focused beam, but focus can be achieved by electronically adding curvature to the recorded spatial frequency map before transformation to an image. A single map may be used to produce multiple images, each with different focus, or small portions of a single image may be independently processed for best focus.

It is significant that the imaging apparatus and method can produce synthetic optical apertures capable of very high resolution. The system could be employed in telescopic applications to produce high resolution images of a distant object such as an earth satellite or the interior of a long pipe. The system may also be employed in microscopic applications, since it is capable of imaging with nearly unlimited depth of focus, which solves a major problem with microscopic imaging systems. When used as a microscope, the system can have a large field of view and a very large stand off distance. For example, one meter diameter synthetic aperture can have a one meter focal distance. Such an F/1 optical system could produce nearly wavelength scale microscopic resolution on an object one meter distant from the illuminator. The magnification of the system is determined by computer processing and the relationship between the frequency chosen and the size of the object. The microscopic embodiment may also have advantages for inspection systems which require high magnification, simulantenously with large fields of view and large depth of focus. Possible applications include VLSI circuit inspections and the inspection of surfaces for magnetic recording media.

It is understood that transform space scanning can be applied to any form of radiation which produces interference phenomena. For example, microwave and longer wavelength radio transmissions, and sound waves can be made to interfere.

Referring to FIG. 2, sources 14 and 16 may be two microwave emitters on the surface of a multi-element phased array radar antenna. Conventional electronically scanned phased array microwave radars produce images of aircraft and other objects in a volume of airspace by the method of sweeping a fan or pencil beam of microwaves. They are a microwave implementation of a pulsed emission flying spot scanner.

In conventional phased array radar scanning, all emitters radiate the same microwave frequency. Control signals are sent individually to each emitter to adjust the phase of the radiated microwaves from each emitter, which causes the radar beam to be directed in a specific direction. A transform space scanned antenna would not require control signals to be sent to each emitter. Instead, each emitter would operate on a unique microwave frequency, producing a large number of independently scanning interference patterns throughout a volume of airspace. The resulting radar image, identical to the image produced by conventional phased array radars, would be produced by electronically processing the received signals using spatial Fourier transformations.

There are two distinct advantages with transform space scanned radar antennas compared to conventional phase steered microwave antennas. First, control singals need not be sent continuously to each emitting element on the antenna. The moving interference patterns from each emitter pair need not be physically synchronized with other pairs, since synchronization is accomplished by post detection signal processing in the receiver. This is a hardware simplification over current phased array radar designs.

Second, there is no requirement that the emitters be located on a flat surface. In fact, the emitters may be located on any curved surface, as long as the surface is rigid and does not deform significantly compared to the size of the transmitted wavelength (for example, less than 1/10 of the microwave wavelength). Like the first advantage, this feature is also a result of independently processing return signals from each emitter pair. There is currently great interest in designing conformal microwave radar antennas which can accomodate the curved surfaces of flying vehicles.

Sound waves are also known to interfere; and sound wave imaging for medical purposes, often called ultrasound imaging, is an important diagnostic tool. Referring to FIG. 3, emitters 48 and 50 may be ultrasound sources which are immersed in water and which project acoustic beams through water to interfere at the object to be imaged. Detector 56 may be an ultrasound acoustic detector, also immersed in water. By measuring a plurality of acoustic spatial frequencies with the apparatus, an acoustic image can be formed with the above described post detection Fourier transformation signal processing. One advantage of transform space scanned imaging over conventional ultrasound imaging is that the transform system never causes the sound energy to be focused to a small high intensity spot. The transform system may provide increased margins of safety when imaging sensitive living tissues such as in a pregnant women.

Thus, although specific embodiments of the invention have been described and illustrated, it is clear that the invention is susceptible to numerous modifications and embodiments within the ability of those art and without the exercise of the inventive faculty. Thus, it should be understood that various changes in form, detail and application of the present invention may be made without departing from the spirit and scope of the invention and it is not intended that the invention be limited except as by the appended claims.

I claim:

1. Apparatus for transform space scanning imaging, comprising:

means for illuminating a target with wave energy selected from the group consisting of acoustic and electromagnetic radiation said wave energy capable of producing an interference pattern, said means comprising at least one pair of spaced apart sources of said wave energy, said pair comprising a first source emitting said wave energy having a first frequency, and a second source emitting said wave energy at a second frequency, said first and second sources producing overlapping fields of illumination for producing at least one interference pattern;

receiver means for receiving said wave energy reflected from said target, and producing first signals indicative of the amplitude and phase of said reflected illumination;

signal processing means responsive to said first signals for determining spatial frequencies of said reflected illumination received from said target, and for producing signals representative of a two dimensional spatial frequency map of said target; and image forming means responsive to said second signals for producing a two dimensional image of said target.

2. The apparatus of claim 1, wherein said wave energy produced by said pair of spaced apart sources is coherent light.

3. The apparatus of claim 1, wherein said illumination means comprises a plurality of said pairs of sources in which each said first frequency is different than each said second frequency, with the differences in said first and second frequencies being different for each said pair of sources, such that each pair of sources creates a uniquely identifiable beat frequency.

4. The apparatus of claim 3, wherein said plurality of pairs of sources have source frequencies which are not fixed, and wherein said receiving means includes cross correlation means for identifying received beat frequencies and phases with corresponding beat frequencies and phases of each of said pairs of sources.

5. The apparatus of claim 1, wherein said illuminating means comprises a pair of said sources, and wherein said first frequency is equal to said second frequency.

6. The apparatus of claim 5, said illuminating means further including means for changing the distance of spacing between said first and second sources.

7. The apparatus of claim 6, wherein said signal processing means includes means for focusing said two dimensional map of spatial frequencies by adding curvature to said spatial frequency map.

8. The apparatus of claim 2, wherein said receiver further comprises a photodetector which produces an analog signal and said receiving means further includes means for converting said analog signal to a digital signal, and wherein said first signal indicative of amplitude and phase of said received illumination is a digital signal.

9. Apparatus for transform space scanning microscopy imaging, comprising:

illuminating means comprising a pair of spaced apart sources of coherent light for illuminating a target, said pair comprising a first source of coherent light having a first frequency, and a second source of coherent light having a second frequency, said pair of sources producing overlapping fields of illumination for producing an interference pattern, said first source being fixed, and said second being movable, such that the distance of spacing between said first and second sources is adjustable;

means for receiving illumination reflected from said target comprising means for producing an output of a first signal indicative of amplitude and phase of the spatial frequency for each spatial positioning of said sources of said pair;

signal processing means for determining and recording the spatial frequencies of said received illumination for each said spatial positioning of said sources, and for producing a second signal representative of a two dimensional frequency map of said target; and image forming means responsive to said second signal for producing an optical two dimensional image of said target.

10. The apparatus of claim 9, wherein said first and second frequencies are the same.

11. The apparatus of claim 9, wherein said first and second frequencies are different.

12. The apparatus of claim 11, wherein said illuminating means further includes at least one frequency shifter for shifting the frequency of at least one of said first and second frequencies.

13. The apparatus of claim 9, further including a second photodetector for receiving illumination scattered from said target for measuring the phase of said scanning interference pattern, and for producing a phase signal received by said signal processing means.

14. A method for transform space scanning imaging, comprising:

illuminating a target with wave energy selected from the group consisting of acoustic and electromagnetic radiation, said wave energy capable of producing an interference pattern from at least one pair of spaced apart sources comprising a first source having a first frequency, and a second source having a second frequency, to produce overlapping fields of illumination generating at least one interference pattern;

receiving scattered illumination reflected from said target on a non-imaging detector means, and producing an output of a first signal indicative of the amplitude and phase of said reflected illumination;

forming a two dimensional spatial frequency map based upon the amplitude and phase of said received illumination, and producing a second signal representative of said two dimensional spatial frequency; and forming a two dimensional image in response to said second signal.

15. The method of claim 14, wherein said wave energy produced by said pair of spaced apart sources is coherent light.

16. The method of claim 14, wherein there are a plurality of said pairs of sources in which each said first frequency is different than each said second frequency, with the differences in said first and second frequencies being different for each said pair of sources, such that each pair of sources creates a uniquely identifiable beat frequency.

17. The method of claim 16, wherein said plurality of pairs of sources have source frequencies which are not fixed, and wherein said step of receiving includes cross correlation of said received illumination frequencies and phases for identifying received beat frequencies and phases with corresponding beat frequencies and phases of each of said pairs of sources.

18. The method of claim 14, wherein there is a pair of said sources, and wherein said first frequency is equal to said second frequency.

19. The method of claim 18, further including the step of changing the distance of spacing between said first and second sources.

20. The method of claim 19, further including the step of focusing said two dimensional map of spatial frequencies by adding curvature to said spatial frequency map.

21. The method of claim 15, wherein said detector is a photodetector which produces an analog signal and further including the step of converting said analog signal to a digital signal, and wherein said first signal indicative of amplitude and phase of said received illumination is a digital signal.

22. A method for transform space scanning microscopy comprising:

illuminating a target with coherent light from a pair of spaced apart sources, said sources comprising a first source having a first frequency and a second source having a second frequency, said sources producing overlapping fields of illumination to generate an interference pattern, and positioning said second source at at least two distances spaced apart from said first source;

receiving said scattered illumination reflected from said target for each said spacing of said sources;

forming a two dimensional spatial frequency map based upon the first signals indicative of said amplitude and phase of illumination received from said target, and producing a second signal representative of said two dimensional spatial frequency map; and forming a two dimensional image of said target in response to said second signal.

23. The method of claim 22, wherein said first and second frequencies are the same.

24. The method of claim 22, wherein said first and second frequencies are different, and are derived from a single laser source.

25. The method of claim 24, further including the step of shifting the frequency of at least one of said first and second frequencies.

26. The method of claim 22, wherein said step of receiving illumination includes receiving illumination scattered from said target for measuring the phase of said scanning interference pattern, and for producing a phase signal received by signal processing means.

* * * * *